United States Patent
Zeev et al.

(10) Patent No.: US 12,254,562 B2
(45) Date of Patent: Mar. 18, 2025

(54) METHOD FOR NIPPLE REPLICATION

(71) Applicant: Proxamama LLC, Las Vegas, NV (US)

(72) Inventors: Shilo Ben Zeev, Las Vegas, NV (US); Hagai Amiel, Las Vegas, NV (US)

(73) Assignee: Proxamama LLC, Las Vegas, NV (US)

( * ) Notice: Subject to any disclaimer, the term of this patent is extended or adjusted under 35 U.S.C. 154(b) by 0 days.

(21) Appl. No.: 17/899,102

(22) Filed: Aug. 30, 2022

(65) Prior Publication Data

US 2023/0069584 A1 Mar. 2, 2023

Related U.S. Application Data

(60) Provisional application No. 63/296,008, filed on Jan. 3, 2022, provisional application No. 63/238,569, filed on Aug. 30, 2021.

(51) Int. Cl.
*G06T 17/00* (2006.01)
*G06N 3/126* (2023.01)
(Continued)

(52) U.S. Cl.
CPC ............. *G06T 17/00* (2013.01); *G06N 3/126* (2013.01); *G06T 7/30* (2017.01); *G06V 10/44* (2022.01); *G06V 20/46* (2022.01); *G06V 40/10* (2022.01)

(58) Field of Classification Search
CPC ........... G06T 17/00; G06T 7/30; G06V 10/44; G06V 20/46; G06V 40/10
See application file for complete search history.

(56) References Cited

U.S. PATENT DOCUMENTS

2009/0051568 A1  2/2009  Corry et al.
2010/0045812 A1*  2/2010  Miyakoshi ............. H04N 5/907
                                                        348/222.1
(Continued)

FOREIGN PATENT DOCUMENTS

WO    2020200087 A1   10/2020
WO    2020219856 A1   10/2020

OTHER PUBLICATIONS

Sendai, machine translation of JP2020156823; Filing date: Mar. 27, 2019 (Year: 2019).*

(Continued)

*Primary Examiner* — Sing-Wai Wu
(74) *Attorney, Agent, or Firm* — Greenberg Traurig, LLP

(57) ABSTRACT

A method includes scanning a user's nipple via a user computing device to generate a scan image and applying a machine learning engine to the scan image to identify the user's nipple. The method also includes generating an output scan image via the machine learning engine, where the output scan image includes features identifying the user's nipple within the output scan image. The method also includes applying a genetic algorithm to the output scan image to generate a 3D image of the user's nipple, where the genetic algorithm employs at least one genetic process and where the 3D image of the user's nipple is a baby bottle nipple profile. The method also includes transmitting the 3D image of the user's nipple to a second user computing device for 3D printing of a custom baby bottle nipple, where the custom baby bottle nipple is a 3D replication of the user's nipple.

21 Claims, 17 Drawing Sheets

(51) Int. Cl.
*G06T 7/30* (2017.01)
*G06V 10/44* (2022.01)
*G06V 20/40* (2022.01)
*G06V 40/10* (2022.01)

(56) References Cited

U.S. PATENT DOCUMENTS

| | | | |
|---|---|---|---|
| 2010/0063612 A1* | 3/2010 | Wang | G06V 10/752 700/110 |
| 2015/0164748 A1 | 6/2015 | Brown et al. | |
| 2017/0272728 A1 | 9/2017 | Rafii et al. | |
| 2017/0274196 A1 | 9/2017 | Nordon et al. | |
| 2017/0312184 A1 | 11/2017 | Lofaro et al. | |
| 2017/0312185 A1 | 11/2017 | Lofaro et al. | |
| 2018/0276841 A1 | 9/2018 | Krishnaswamy et al. | |
| 2018/0318177 A1* | 11/2018 | Bolten | A61J 11/005 |
| 2019/0042871 A1 | 2/2019 | Pogorelik | |
| 2019/0046414 A1 | 2/2019 | Gledhill | |
| 2019/0291307 A1 | 9/2019 | Wright | |
| 2020/0078503 A1* | 3/2020 | Bartlett | A61M 1/06 |
| 2020/0318946 A1* | 10/2020 | Wolke | G03B 35/26 |
| 2021/0342836 A1 | 11/2021 | Cella et al. | |

OTHER PUBLICATIONS

Karnan et al., "Automatic detection of the breast border and nipple position on digital mammograms using genetic algorithm for asymmetry approach to detection of microcalcifications," Computer Methods an Programs in Biomedicine 87 (2007) 12-20, p. 12-20 (Year: 2007).*

Medela, "Brest Shield Sizing: How to Get the Best Fit," Sep. 27, 2020. https://web.archive.org/web/20200927132223/htttps://www.medela.us/breastfeeding/articles/breast-shield-sizing-how-to-get-the-best-fit (Year: 2020).*

Srivastava et al. ("An Effective Model for Face Detection Using R, G, B, Color Segmentation with Genetic Algorithm," Proc. of First International Conference on Information and Communication Technology for Intelligent Systems: vol. 2, Smart Innovation, Systems and Technologies 51, 2016, pp. 47-55. (Year: 2016).*

Mohammadi et al., "Real-Time Evaluation of Breast Self-Examination Using Computer Vision", International Journal of Biomedical Imaging, vol. 2014, Article ID 924759, 12 pages, Published Nov. 11, 2014. (Year: 2014).*

Matkowski, et al. "The Nipple-Areola Complex for Criminal Identification" pp. 1-7. International Conference on Biometrics. Online. Jun. 2, 2019; rerieved Jan. 26, 2023] <https://www.researchgate.net/publication/333444842_The_Nipple-Areola_Complex_for_Criminal_Identification>.

Xu, et al. "3D Joints Estimation of the Human Body in Single-Frame Point Cloud" p. 178900-178908. Sep. 30, 2020; retrieved Mar. 15, 2023. <https://ieeexplore.ieee.org/stamp/stamp.jsp?arnumber=9210042.

* cited by examiner (1) ISOLATED NIPPLE POINT CLOUD (2) ORIENT USING POINT CLOUD NORMALS (3) FILTER BY POINT CLOUD NORMALS (4) REBUILD USING CONTOUR DATA (5) MARCHING CUBE WATER TIGHT MESH

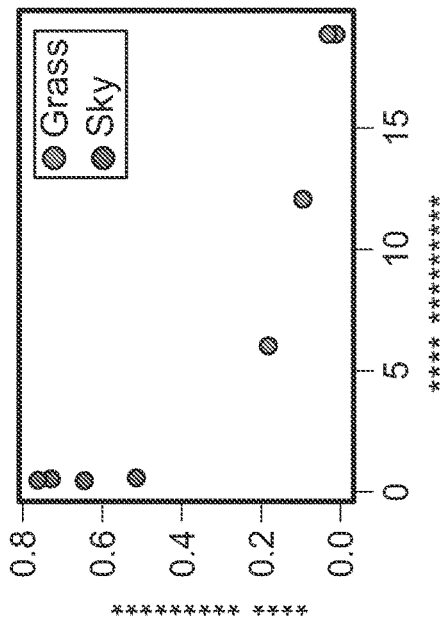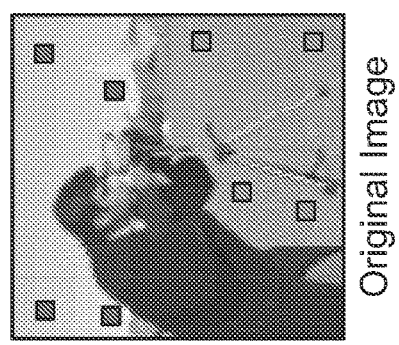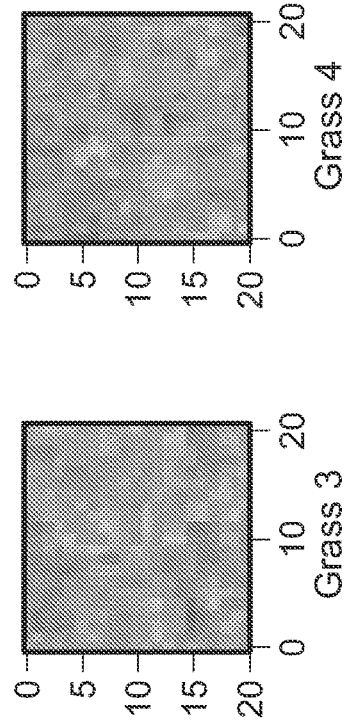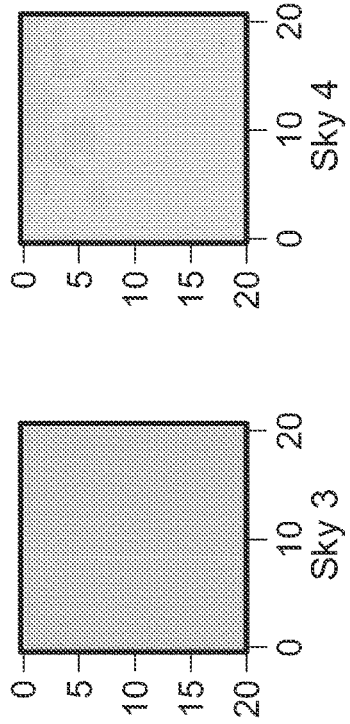
FIG. 14

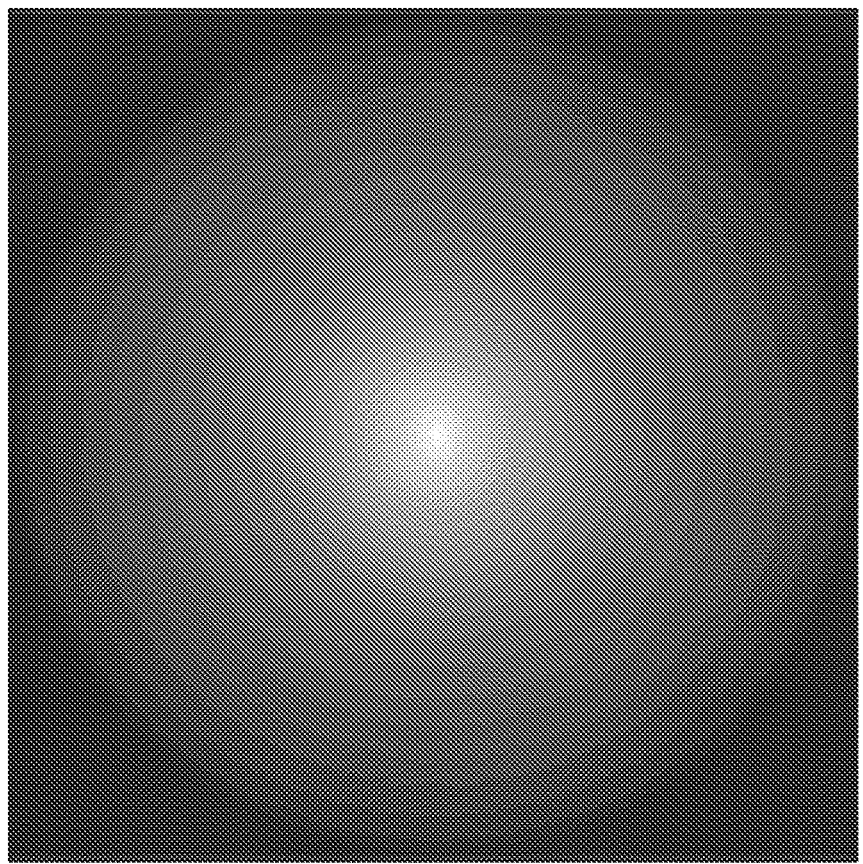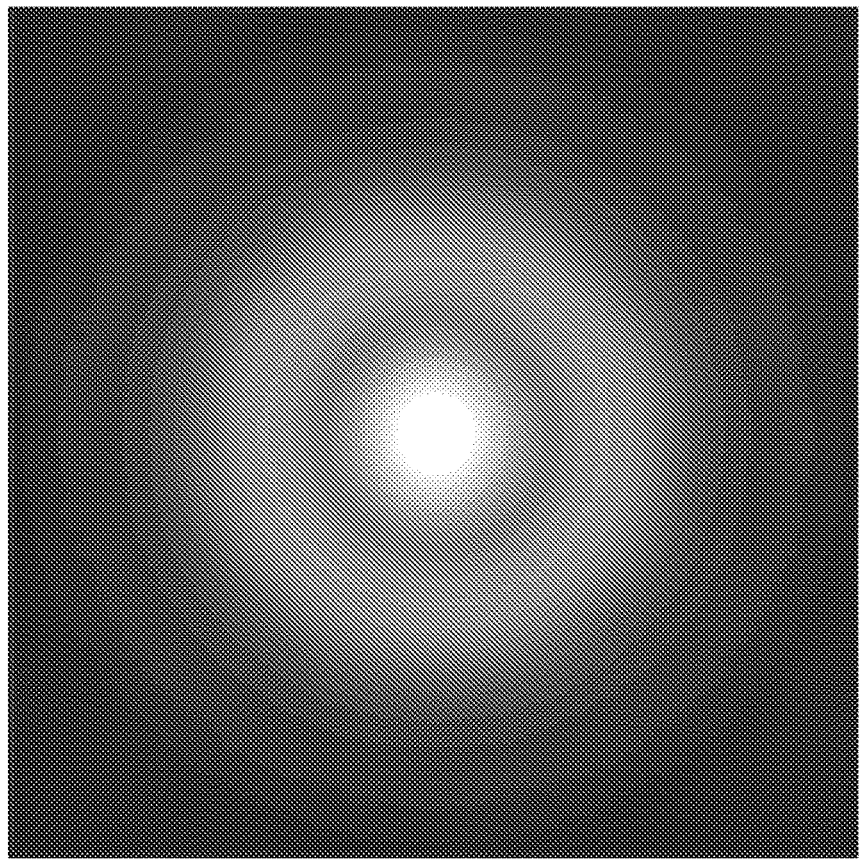
SMOOTH (LEFT) and ROUGH (RIGHT) Intensity maps
FIG. 16

METHOD FOR NIPPLE REPLICATION

FIELD OF INVENTION

The present disclosure relates generally to feeding devices for infants. Specifically, the present disclosure relates to methods of customizing feeding device nipples.

BACKGROUND

Feeding devices, such as baby bottles, are often used to feed babies from newborns to toddlers for various reasons. Reasons for using a feeding device include, but are not limited to: latching difficulties by the baby, inability for the mother to produce enough milk, feeding by a caregiver or physician other than the mother, inability for the mother to breastfeed for health reasons, weaning of the baby, etc.

SUMMARY OF THE INVENTION

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a method including scanning, by a processor, a user's nipple via a user computing device to generate a scan image. The method also includes applying, by the processor, a machine learning engine to the scan image to identify the user's nipple within the image scan. The method also includes generating, by the processor, an output scan image via the machine learning engine, where the output scan image includes one or more features identifying the user's nipple within the output scan image. The method also includes applying, by the processor, a genetic algorithm to the output scan image to generate a three-dimensional (3D) image of the user's nipple, where the genetic algorithm employs at least one genetic process and where the 3D image of the user's nipple is a baby bottle nipple profile. The method also includes transmitting, by the processor, the 3D image of the user's nipple to a second user computing device for 3D printing of a custom baby bottle nipple, where the custom baby bottle nipple is a 3D replication of the user's nipple.

In some embodiments, the method further includes training, by the processor, the machine learning engine to identify a nipple within a scan image based at least in part on a set of images comprising at least a portion of a nipple of a human.

In some embodiments, the scan image is a video comprising at least two image frames.

In some embodiments, the machine learning engine is trained to identify the nipple within each frame of the scan image.

In some embodiments, the method further includes prompting, by the processor, the user to rescan the nipple if the machine learning engine does not identify a nipple within each frame of the scan image.

In some embodiments, the method further includes gathering and creating a point cloud, by the processor, by stitching each image frame of the scan image together.

In some embodiments, a first genetic process of the at least one genetic process includes orienting, by the processor, the point cloud from the scan image with a teat of the user's nipple in a predetermined direction.

In some embodiments, the predetermined direction is along a positive z axis.

In some embodiments, a second genetic process of the at least one genetic process includes setting, by the processor, an average normal at a top portion of the point cloud as close to the positive z axis as possible.

In some embodiments, a third genetic process of the at least one genetic process includes maximizing, by the processor, a height at which the teat exceeds a predetermined cross-sectional diameter.

In some embodiments, the predetermined cross-sectional diameter is 30 mm.

In some embodiments, the genetic algorithm filters out a normal of each point in the point cloud further and further away from the positive z axis, until there is a clear separation between the teat and a base of the user's nipple.

In some embodiments, the method further includes rebuilding, by the processor, the user's nipple without any gaps or holes by extracting key contours and measurements from the image scan.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

FIG. 14 is a set of graphs depicting a roughness algorithm output, according to one or more embodiments of the present disclosure.

FIG. 16 is smooth intensity map and a rough intensity map, according to one or more embodiments of the present disclosure.

DETAILED DESCRIPTION

Figure 1:
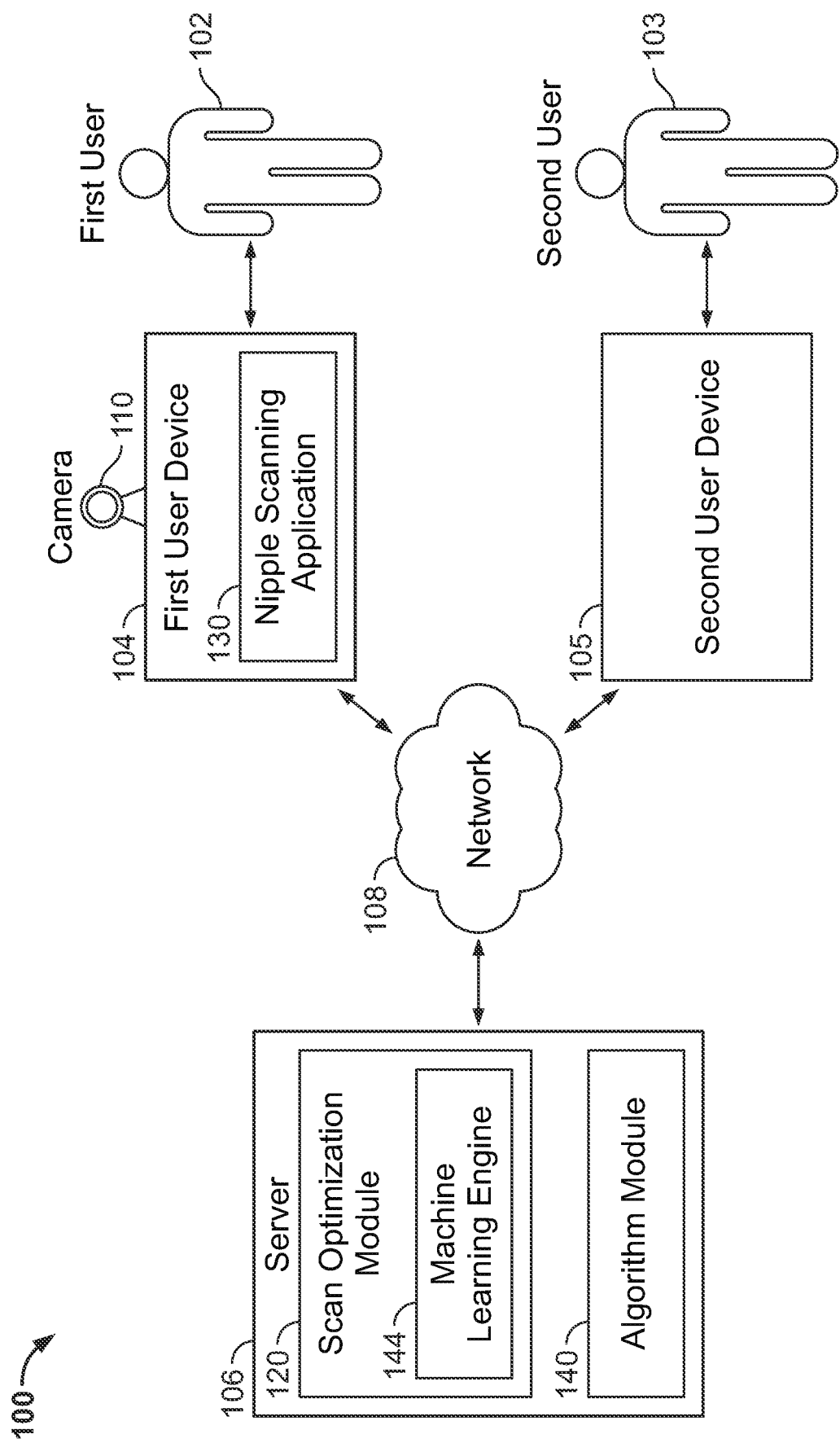
FIG. 1 is a block diagram illustrating an operating computer architecture for predictive visualization of a medical procedure of a user, according to one or more embodiments of the present disclosure.

The present invention can be further explained with reference to the included drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

Nipple confusion is a common syndrome in which newborn babies have trouble latching to their mother's breast after being fed with a baby bottle. In some embodiments, one potential solution to this problem may be to make the baby bottle's nozzle and mechanisms resemble those of the mother's nipple. Described herein are methods for scanning and replicating the shape of a mother's nipple such that the replicated nipple may be integrated with a baby bottle. In some embodiments, an automated mass is created using a customization technique for replicating the shape of a mother's nipple and integrating the replicated nipple with a larger baby bottle. Also described herein are platforms for providing enhanced scans of the mother's breast. In some embodiments, artificial intelligence (AI) is used to optimize the scans provided by the platform. In some embodiments, this methods described herein use a combination of 3D scanning, AI object detection, a novel mesh post-processing and a novel texturizing procedure to create custom nipples for users.

In some embodiments, as described above, AI is used to produce a scan image of the mother's breast using object detection. In some embodiments, the AI includes at least one machine learning model, such as a neural network. In some embodiments, the neural network is a convolutional neural network. In some embodiments, the neural network is a deep learning network, a generative adversarial network, a recurrent neural network, a fully connected network, or combinations thereof.

In some embodiments, to gather easy and adequate scans for nipple replication, the present disclosure provides a method of scanning for users to use in their homes using a structural light sensor often found in the front-facing camera in modern mobile phones. In some embodiments, the scanning method utilizes a mobile phone's built-in facial recognition system to take multiple scans of a mother's breast by stitching individual scans of the mother's breast, taken by the mobile phone, to form a sparse 3D point cloud. In some embodiments, the scanning method also includes recognizing the mother's breast in 3D space and detecting a frontal image of the mother's nipple to use for color matching. In some embodiments, the scanning method includes extracting key measurements and contours of the mother's nipple scan to direct the mother to the most appropriate nipple product for her unique body.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention. Further, when a particular feature, structure, or characteristic is described in connection with an implementation, it is submitted that it is within the knowledge of one skilled in the art to effect such feature, structure, or characteristic in connection with other implementations whether or not explicitly described herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Objective-C, Swift, Java, Javascript). The aforementioned examples are, of course, illustrative and not restrictive.

As used herein, the terms "image(s)" and "image data" are used interchangeably to identify data representative of visual content which includes, but not limited to, images encoded in various computer formats (e.g., ".jpg", ".bmp," etc.), streaming video based on various protocols (e.g., Real-time Streaming Protocol (RTSP), Real-time Transport Protocol (RTP), Real-time Transport Control Protocol (RTCP), etc.), recorded/generated non-streaming video of various formats (e.g., ".mov," ".mpg," ".wmv," ".avi," ".flv," ect.), and real-time visual imagery acquired through a camera application on a mobile device.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

FIGS. 1 through 17 illustrate exemplary systems and methods for scanning and replicating the shape of a mother's nipple such that the replicated nipple may be integrated with a baby bottle. The following embodiments provide technical solutions and technical improvements that overcome technical problems, drawbacks and/or deficiencies in at least one technical field involving efficiency and accuracy of computing systems utilized in assisting the formation of baby bottle nipples that accurately mimic the nipple of a breastfeeding mother, described herein. For example, at least one technical difficulty is the efficiency of computing system in extracting from images, e.g., pixels, useful visual data that can be utilized to replicate a mother's nipple. As explained in more detail below, the present disclosure provides a technically advantageous computer architecture that improves scan images of a mother's breast, based at least in part on scan image data of other users (i.e., other breastfeeding mothers), to create a more realistic and lifelike baby bottle nipple that mimics the nipple of the breastfeeding mother, thereby reducing nipple confusion by the baby. In some embodiments, the systems and methods are technologically improved by being programmed with machine-learning modeling to create a 3D scan image. Some embodiments leverage the wide-spread use of mobile personal communication devices (e.g., smart phones with integrated cameras) to facilitate the inputting of user-generated data to enhance the 3D scan image.

FIG. 1 illustrates a block diagram illustration of an exemplary nipple scanning system 100 consistent with some embodiments of the present disclosure. The components and arrangements shown in FIG. 1 are not intended to limit the disclosed embodiments as the components used to implement the disclosed processes and features may vary. In accordance with the disclosed embodiments, the nipple scanning system 100 may include a server 106 in communication with a first user computing device 104 of a first user 102 and a second user computing device 105 of a second user 103 via a network 108.

Network 108 may be of any suitable type, including individual connections via the internet such as cellular or Wi-Fi networks. In some embodiments, network 108 may connect participating devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, WAN or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Server 106 may be associated with a medical practice or other type of practice or entity. For example, server 106 may manage user information. One of ordinary skill will recognize that server 106 may include one or more logically or physically distinct systems.

In some embodiments, the server 106 may include hardware components such as a processor (not shown), which may execute instructions that may reside in local memory and/or transmitted remotely. In some embodiments, the processor may include any type of data processing capacity, such as a hardware logic circuit, for example, an application specific integrated circuit (ASIC) and a programmable logic, or such as a computing device, for example a microcomputer or microcontroller that includes a programmable microprocessor.

In some embodiments, the first user computing device 104 may be associated with the first user 102 who is a breastfeeding mother. In some embodiments, the second user computing device 105 may be associated with the second user 103 who is an entity, such as a medical practice or medical products company. When the first user 102 wishes to generate a baby bottle nipple, the server 106 may prompt the first user 102 to input user information and a scan image via the first user computing device 104.

In some embodiments, the first user computing device 104 and/or the second user computing device 105 may be a mobile computing device. The first user computing device 104 and/or the second user computing device 105, or mobile user devices, may generally include at least computer-readable non-transient medium, a processing component, an Input/Output (I/O) subsystem and wireless circuitry. These components may be coupled by one or more communication buses or signal lines. The first user computing device 104 and/or the second user computing device 105 may be any portable electronic devices, including a mobile phone, a handheld computer, a tablet computer, a laptop computer, a tablet device, a multifunction device, a portable gaming device, a vehicle display device, or the like, including a combination of two or more of these items. In some embodiments, the mobile user device may be any appropriate device capable of taking still images or video with an equipped front camera. In some embodiments, the first user computing device 104 and/or the second user computing device 105 may be a desktop computer.

As shown in FIG. 1, in some embodiments, the first user computing device 104 includes a user camera 110. In some embodiments, at least one user image may be captured by the user camera 110 and transmitted via network 108. In some embodiments, the at least one scan image capture may be performed by a nipple scanning application 130 available to all users of the first user computing device 104. In some embodiments, the at least one scan image capture may be performed by a camera application that comes with a mobile first user computing device 104, and the resulting at least one scan image may be uploaded to the nipple scanning application 130.

In some embodiments, wireless circuitry is used to send and receive information over a wireless link or network to one or more other devices' suitable circuitry such as an antenna system, an RF transceiver, one or more amplifiers, a tuner, one or more oscillators, a digital signal processor, a CODEC chipset, memory, etc. The wireless circuitry can use various protocols, e.g., as described herein.

It should be apparent that the architecture described is only one example of an architecture for the first user computing device 104 and/or the second user computing device 105, and that the first user computing device 104 and/or the second user computing device 105 can have more or fewer components than shown, or a different configuration of components. The various components described above can be implemented in hardware, software, or a combination of both hardware and software, including one or more signal processing and/or application specific integrated circuits.

In some embodiments, the first user computing device 104 may include an application such as the nipple scanning application 130 (or application software) which may include program code (or a set of instructions) that performs various operations (or methods, functions, processes, etc.), as further described herein.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the nipple scanning application 130 enables the first user 102 to upload a scan image to the server 106. In some embodiments, the nipple scanning application 130 may be an application provided by a medical entity or other entity. In one implementation, the nipple scanning application 130 may be automatically installed onto the first user computing device 104 after being downloaded. In addition, in some embodiments, the nipple scanning application 130 or a component thereof may reside (at least partially) on a remote system (e.g., server 106) with the various components (e.g., front-end components of the nipple scanning application 130) residing on the first user computing device 104. As further described herein, the nipple scanning application 130 and the server 106 may perform operations (or methods, functions, processes, etc.) that may require access to one or more peripherals and/or modules. In the example of FIG. 1, the server 106 includes a scan optimization module 120 and an algorithm module 140, as will be described in further detail below.

In some embodiments, the scan image 112 may be processed by the scan optimization module 120, which is specifically programmed in accordance with the principles of the present invention with one or more specialized inventive computer algorithms. Further, in some embodiments, the scan optimization module 120 can be in operational communication (e.g., wireless/wired communication) with the server 106 which can be configured to support one or more functionalities of the scan optimization module 120.

Figure 2:
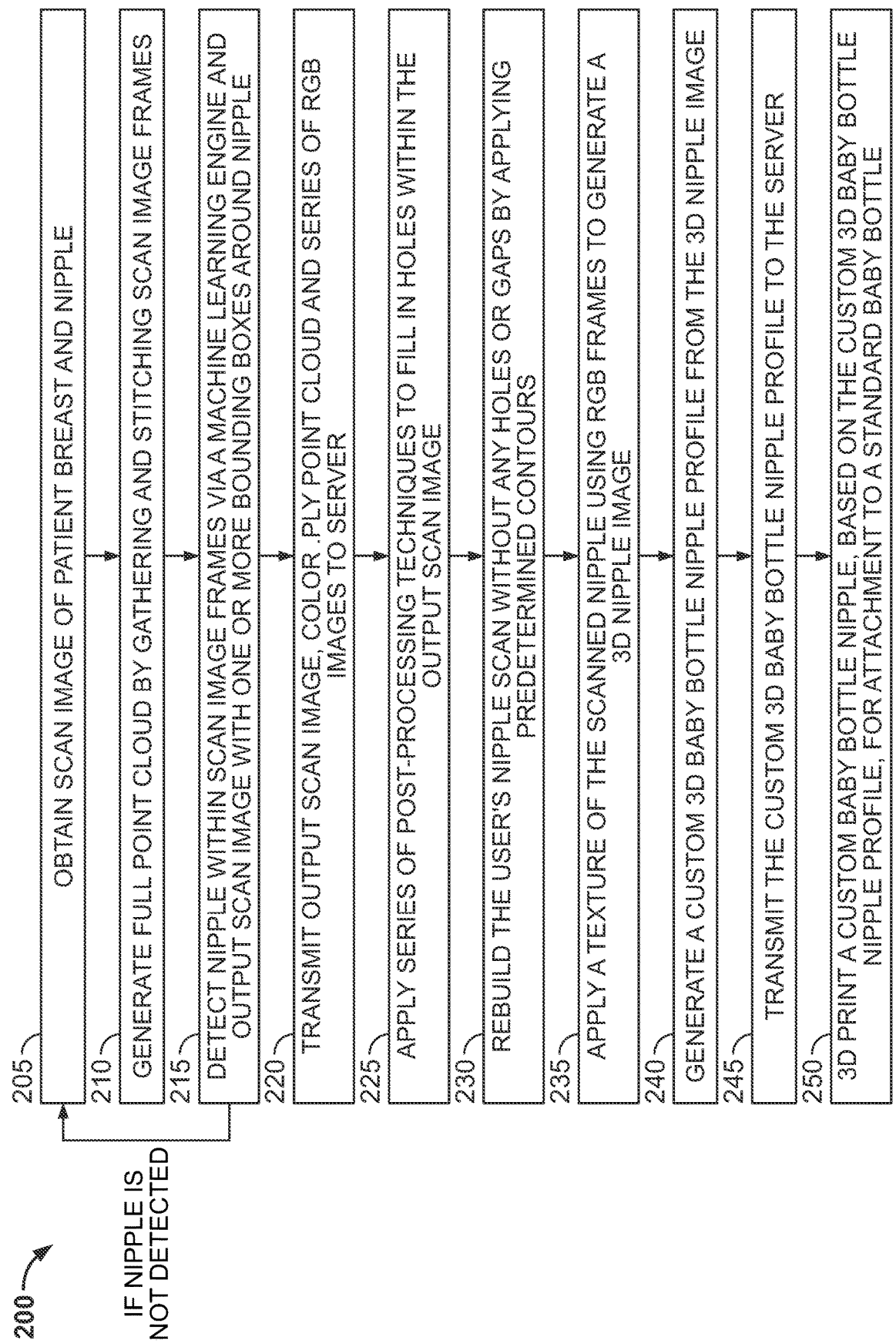
FIG. 2 is a flow diagram illustrating a method for scanning and replicating the shape of a mother's nipple, according to one or more embodiments of the present disclosure.

FIG. 2 illustrates a flow diagram of an exemplary method 200 of creating a 3D nipple from a scan image, according to some embodiments of the present disclosure.

Figure 3:
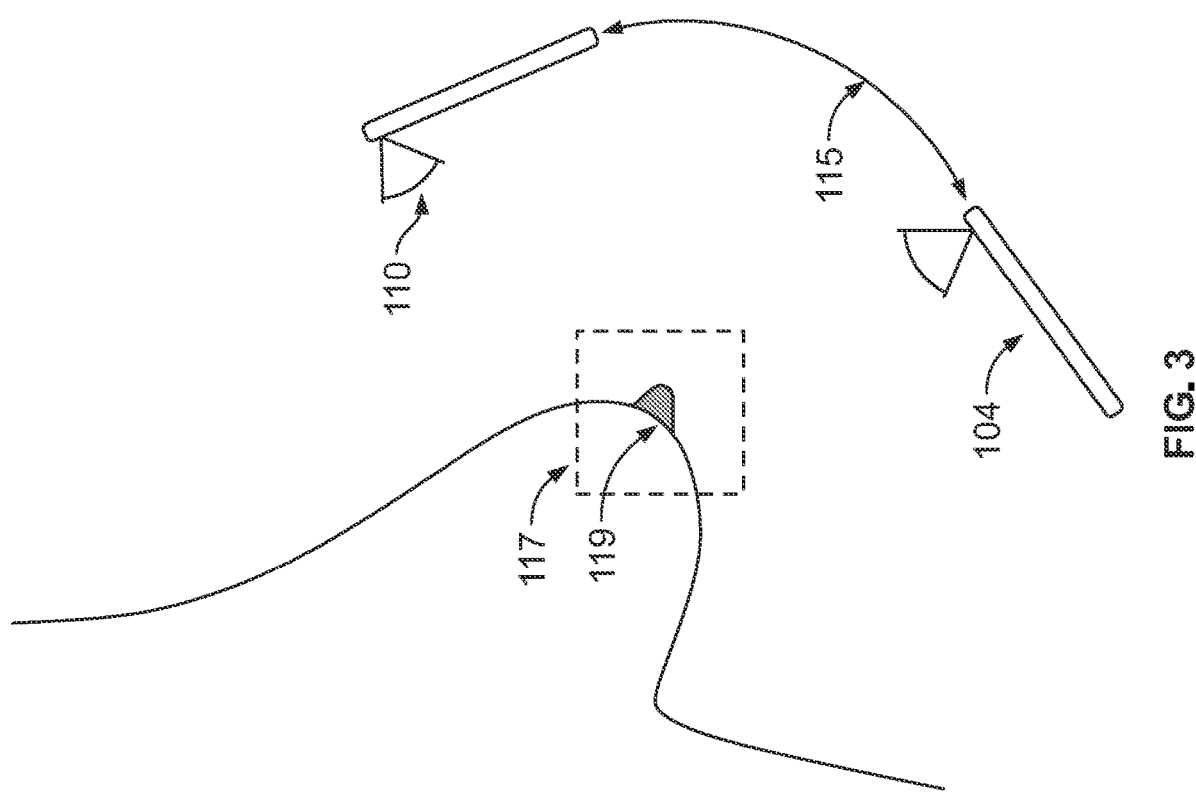
FIG. 3 is a schematic diagram depicting an exemplary path for scanning a nipple of a user, according to one or more embodiments of the present disclosure.

At step 205, once the first user 102 is ready to scan her breast, the first user 102 places the first user computing device 104 approximately 1 to 2 feet underneath the user's breast 117 with a front camera 110 of the first user computing device 104 framing the nipple 119 she wants to replicate. When ready, she presses record and gradually moves the first user computing device 104 upwards from below her breast to slightly above the nipple, keeping the nipple approximately centered in frame, as depicted in FIG. 3. At step 205, the first user 102 may also enter user information.

Figure 4:
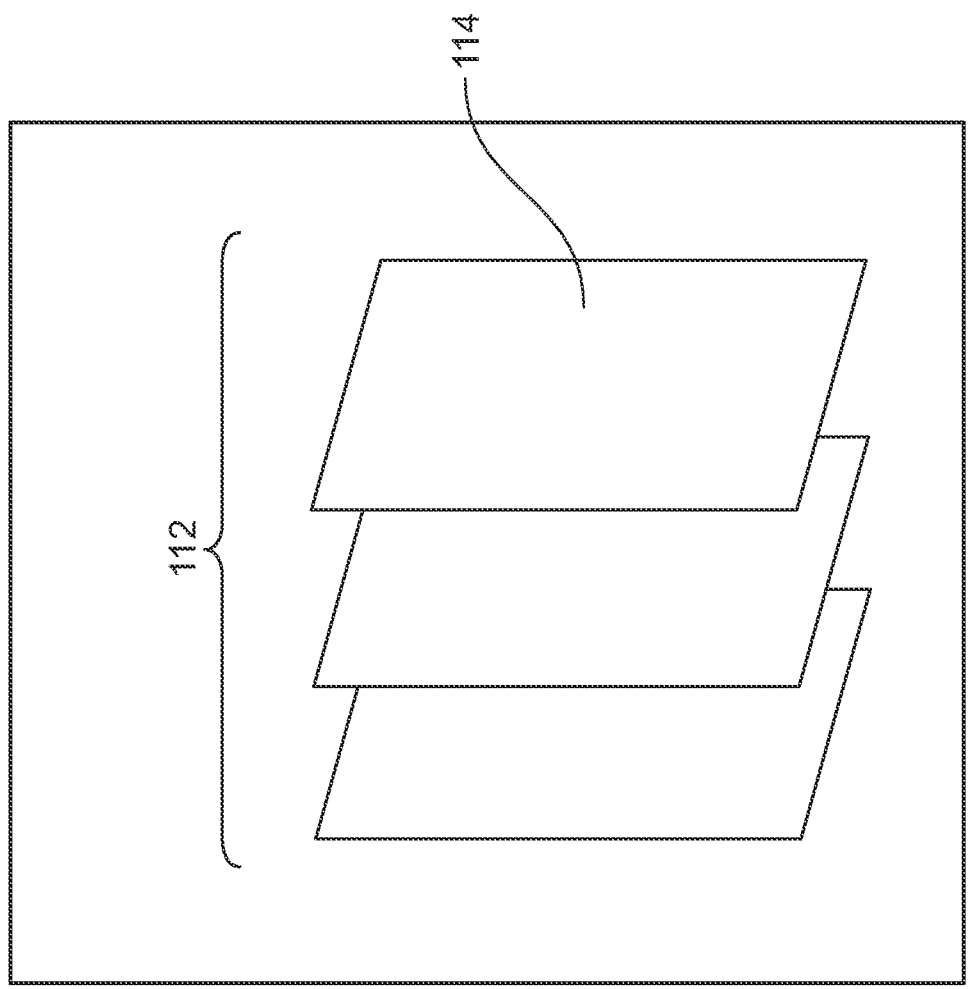
FIG. 4 is a schematic diagram of a plurality of frames of a scan image, according to one or more embodiments of the present disclosure.

At step 210, in some embodiments, the nipple scanning application 130 gathers and creates a full point cloud. For example, in some embodiments, the scan image 112 may be a video stream including a plurality of frames 114. As shown in FIG. 4, an exemplary video stream captured by the user camera 110 (e.g., a camera of a mobile phone) can be divided into frames 114. In some embodiments, each frame 114 may contain an image data with any known color model, including but not limited to: YCrCb, RGB, LAB, etc. In some embodiments, the nipple scanning application 130 creates an RGB image sequence. In some embodiments, the nipple scanning application 130 takes each frame 114 of the scan image 112 and stitches the frames 114 together to create the point cloud. In some embodiments, the scan image 112 (e.g., input video stream) may include any appropriate type of source for video contents. In some embodiments, the contents from the scan image 112 (e.g., the scanning video of FIG. 4) may include both video data and metadata. In some embodiments, the scan image 112 is a scan of the user's breast, captured by the front camera of the first user computing device 104.

At 215 the scan optimization module 120 may recognize the nipple complex in the scan image 112. In some embodiments, the scan optimization module 120 may be implemented as an application (or set of instructions) or software/hardware combination configured to perform operations (or methods, functions, processes, etc.) for receiving and processing image data inputs (e.g., without limitation, image(s), video(s), etc.), via the network 108, from the first user computing device 104. The scan optimization module 120 may receive the scan image 112 from the first user 102 and employ a machine learning engine 144 to identify the user's nipple within the scan image 112. In some embodiments the machine learning engine 144 may include, e.g., software, hardware and/or a combination thereof. For example, in some embodiments, the machine learning engine 144 may include a processor and a memory, the memory having instructions stored thereon that cause the processor to generate, without limitation, at least one 3D image.

In some embodiments, the machine learning engine 144 may be configured to utilize a machine learning technique. In some embodiment, the machine learning engine 144 may include one or more of a neural network, such as a feedforward neural network, radial basis function network, an image classifier, recurrent neural network, convolutional network, generative adversarial network, a fully connected neural network, or some combination thereof, for example. In some embodiments, the machine learning engine 144 may be composed of a single level of linear or non-linear operations or may include multiple levels of non-linear operations. For example, the machine learning engine 144 may include numerous layers and/or hidden layers that perform calculations (e.g., dot products) using various neurons.

In some embodiments and, optionally, in combination of any embodiment described above or below, an exemplary implementation of Neural Network may be executed as follows:

i) Define Neural Network architecture/model,
    ii) Transfer the input data to the exemplary neural network model,
    iii) Train the exemplary model incrementally,
    iv) determine the accuracy for a specific number of timesteps,
    v) apply the exemplary trained model to process the newly-received input data,
    vi) optionally and in parallel, continue to train the exemplary trained model with a predetermined periodicity.

In some embodiments, the scan optimization module 120 may employ object recognition techniques to identify a nipple within a scan image 112. For example, in some embodiments, the scan optimization module 120 may employ an object detection model. In some embodiments, the object detection model may employ the machine learning engine 144 to recognize a nipple in the scan image 112. In some embodiments, the machine learning engine 144 is a convolutional neural network that performs a convolution operation to recognize objects in images. In some embodiments, a deep convolutional neural network (CNN) may be run to retrieve a feature vector, known as the encoder part. In some embodiments, scan image data may be connected with the feature vector and nonlinear convolutional layers are run to identify an object in a scan image.

In some embodiments the object detection model of the present disclosure includes a base architecture or series of "layers" it uses to process scan image data and return information about what is in the scan image 112. In some embodiments, the object detection model is trained on a unique dataset to recognize information in an image. In some embodiments, the dataset is gathered from multiple users taking images of their breasts, mostly along a specific path 115, as depicted in FIG. 3, moving from below the breast to just above the nipple. In some embodiments, the machine learning engine 144 of the object detection model is trained on a set of scan images of previous users used in a wide variety of applications that contain a nipple to detect the nipple location in a two-dimensional image. In some embodiments, the machine learning engine 144 is trained on hundreds of training scan images. In other embodiments, the machine learning engine 144 is trained on thousands of training scan images. In other embodiments, the machine learning engine 144 is trained on tens of thousands of training scan images. In other embodiments, the machine learning engine 144 is trained on hundreds of thousands of training scan images.

Figure 5:
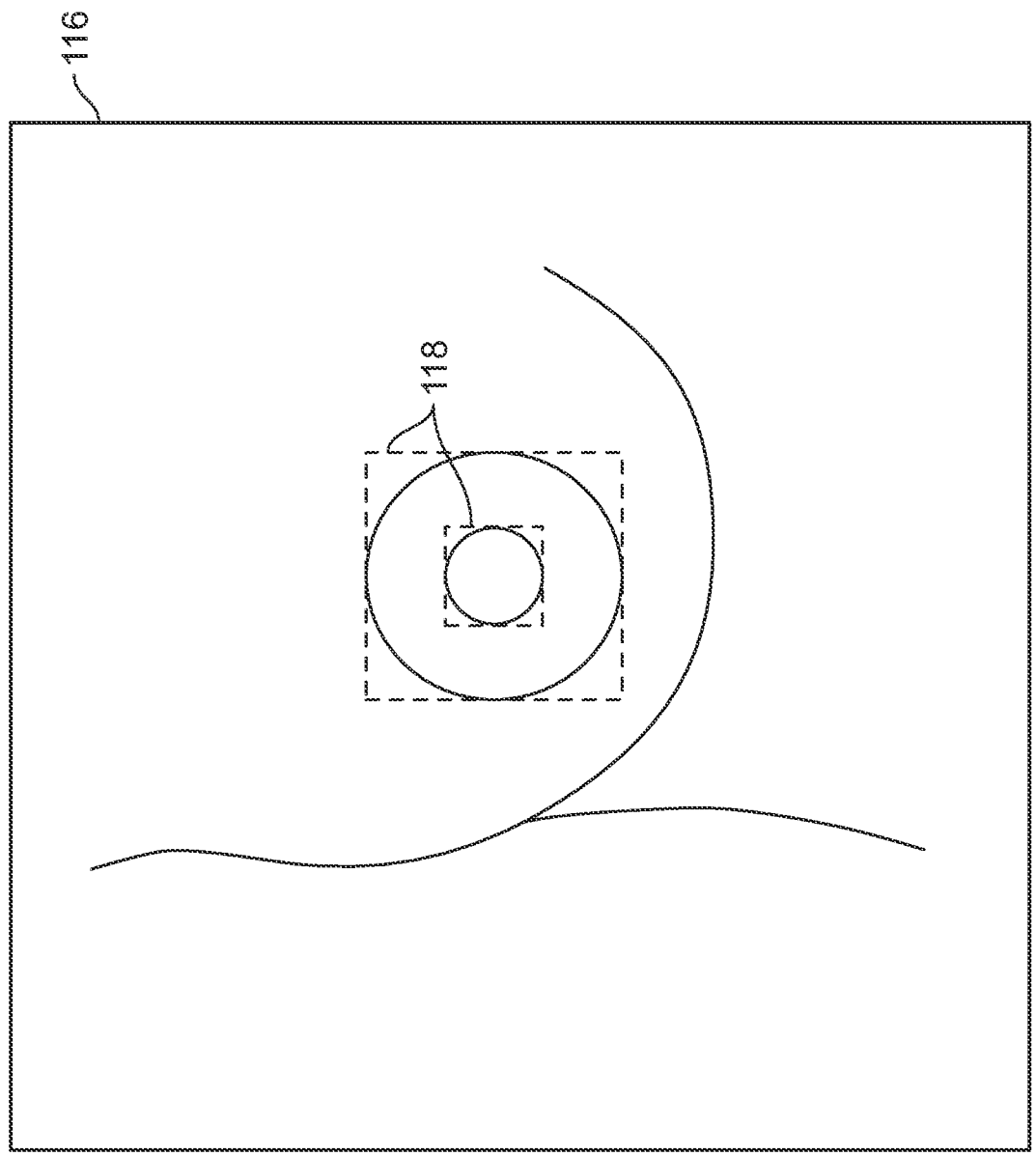
FIG. 5 is an exemplary output scan image with a bounding box, according to one or more embodiments of the present disclosure.

In some embodiments, the machine learning engine 144 is designed to identify a single key frame of the nipple for color, help ensure that the user's scan image 112 is correctly seeing the nipple and isolate the nipple part of the point cloud for a genetic algorithm of the algorithm module 140. In some embodiments, the machine learning engine 144 outputs an output scan image 116 with one or more bounding boxes 118 (e.g. defined by a point, width, and height), and a class label for each bounding box 118, as depicted in FIG. 5. In some embodiments, the trained machine learning engine 144 detects at least one group of classes. In some embodiments, the groups of classes are: 1) a nipple complex including the areola and the teat; 2) only a teat; or 3) a frontal view of the entire nipple (for collecting information on color).

At step 215, in some embodiments, if the machine learning engine 144 detects during scanning that too many of the scan image frames 114 do not contain a nipple, the application provides an error message to the user and asks the user to re-scan her nipple, starting the method again at step 210.

At step 220, the nipple scanning application 130 may transmit the output scan image 116 with the 3D bounding box 118 around the nipple, the colored .ply point cloud, and the series of color (RGB) images to the server 106 for a novel post-processing and texturizing procedure for nipple geometries.

While the process for collecting the output scan image is designed to be easy, the resulting output scan image may contain holes and noise due to the lower resolution of the scanner and the natural fluctuations of the scan image. As a result, in step 225, a series of post-processing techniques are required to fill in the holes within the output scan image 116, while crucially collecting important dimensional information about the nipple itself. In some embodiments, if the post-processing procedure shows an error message, the user is given information as to why an error occurred and is asked to re-scan her nipple.

Figure 6:
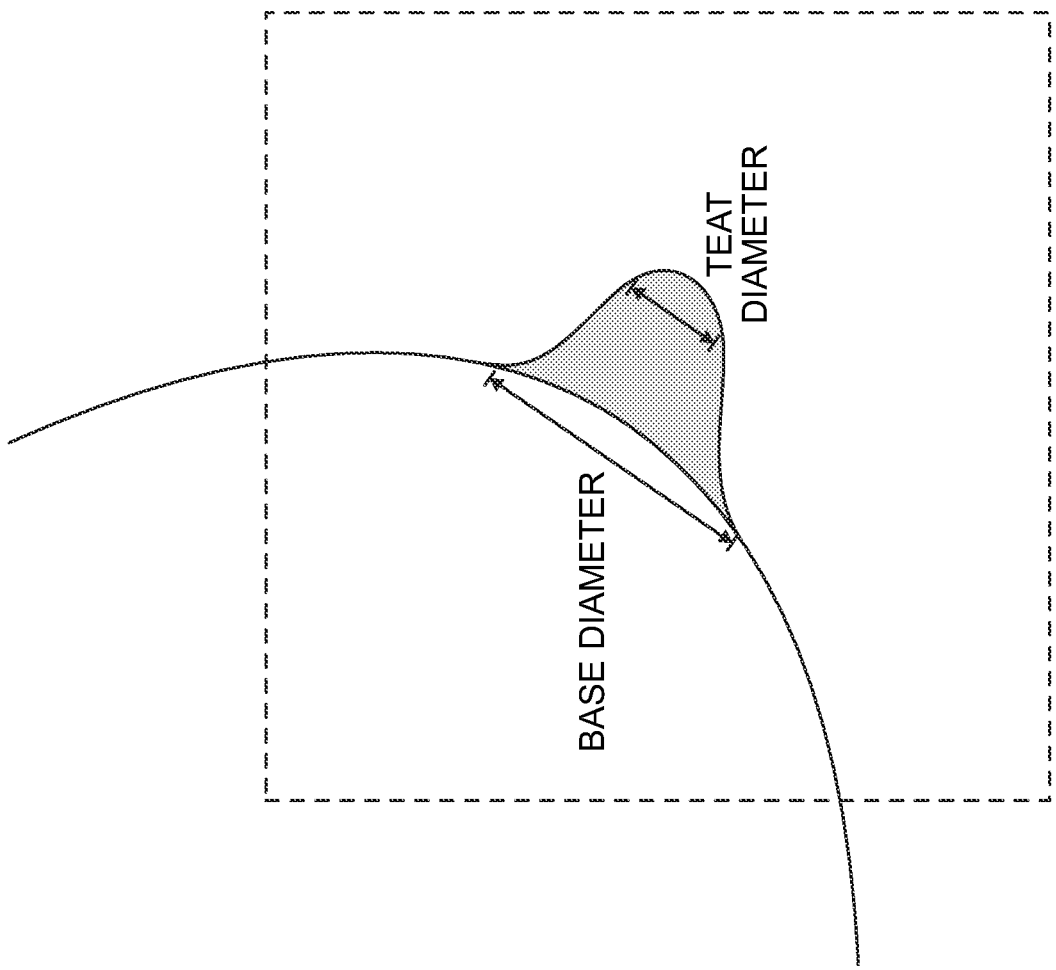
FIG. 6 is a schematic diagram of a nipple depicting a base diameter and a teat diameter, according to one or more embodiments of the present disclosure.

Every nipple contains two important dimensions as it pertains to nipple confusion: base diameter and teat diameter. The base diameter is defined as the diameter around which the nipple meets the breast, and the teat diameter is defined as the diameter around which the nipple starts to curve downward or its inflection point, as depicted in FIG. 6. In some embodiments, the post-processing techniques described below replicate nipple geometry and extract base and teat diameter information for both tailored and customized baby bottle nipple solutions. FIGS. 7A-7E depicts each step of the post-processing method applied to an isolated nipple point cloud, depicted in FIG. 7A, according to embodiments of the present disclosure.

Figure 7A:
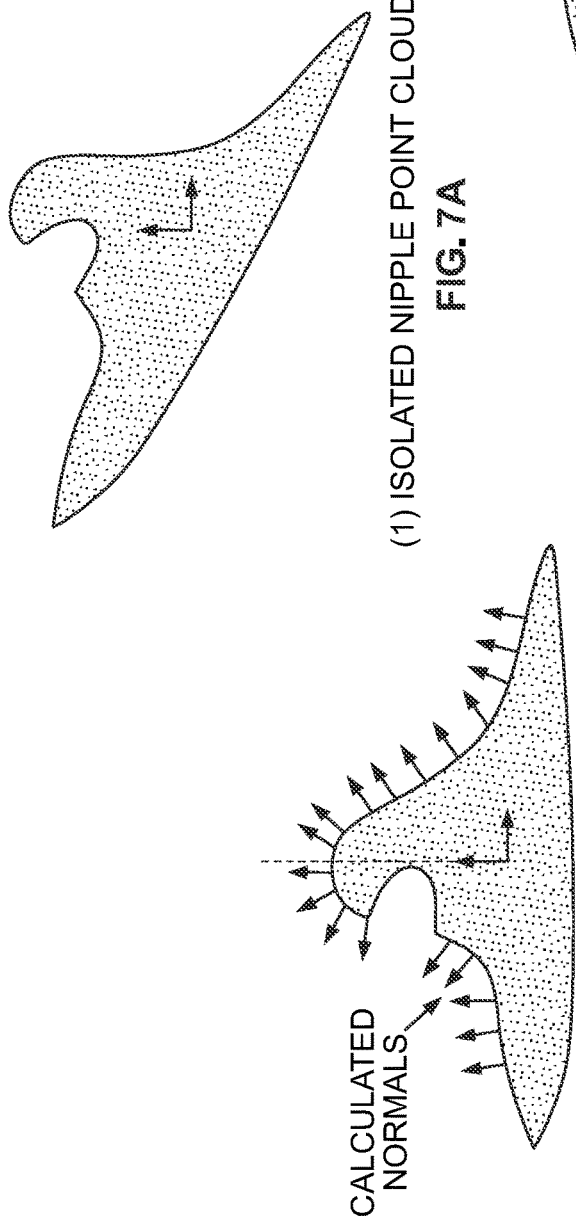
FIG. 7A is an isolated nipple point cloud, according to one or more embodiments of the present disclosure.
Figure 7B:
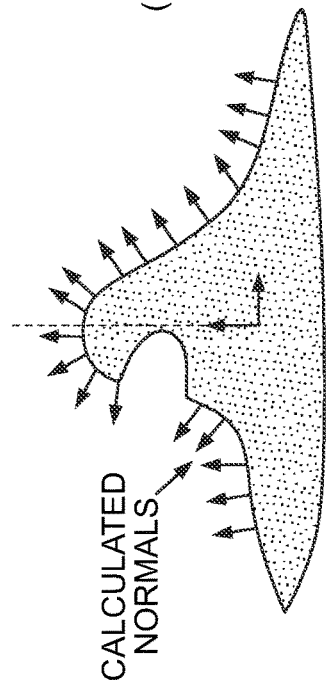
FIG. 7B is a nipple point cloud oriented using point cloud normal, according to one or more embodiments of the present disclosure.
Figure 7C:
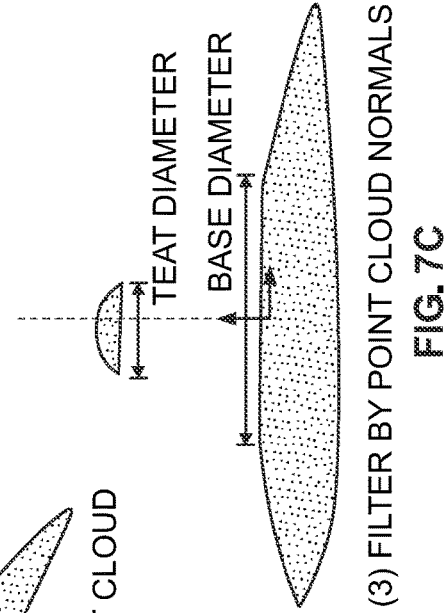
FIG. 7C is a nipple point cloud with point cloud normals filtered to create a gap in the scan that isolates the teat from the breast, according to one or more embodiments of the present disclosure.

At 225, the algorithm module 140 uses the genetic algorithm to perform various tasks, as will be described in further detail below. In some embodiments, the genetic algorithm automatically orients the isolated nipple point cloud upwards along the z-axis, as depicted in FIG. 7B. In some embodiments, the algorithm module also calculates the normals at each point. In some embodiments, the algorithm module gradually filters out those normals that are too far from the z-axis to create a gap in the scan that isolates the teat from the breast, as depicted in FIG. 7C. The genetic algorithm, in some embodiments, works in three steps, described below with reference to FIGS. 7A-C and 9-11, and involves collecting information on: 1) nipple height; 2) teat width; 3) nipple base width; 4) large scale textural roughness; 5) small scale textural roughness; and 6) nipple color.

Figure 8:
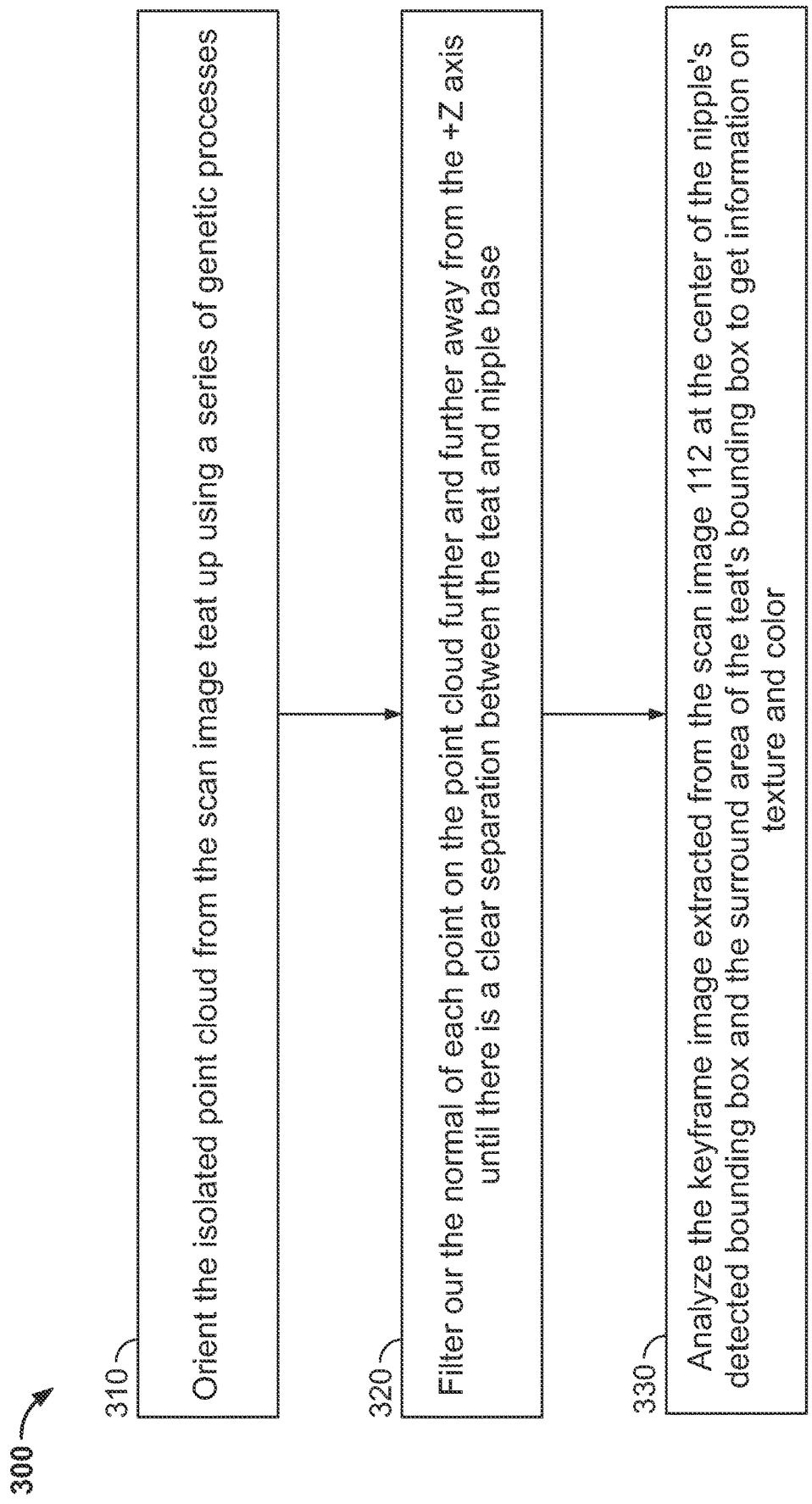
FIG. 8 is a flow diagram illustrating a genetic algorithm method, according to one or more embodiments of the present disclosure.

FIG. 8 is a flow chart depicting the genetic algorithm method 300. In some embodiments, at 310, the genetic algorithm orients the isolated point cloud from the scan image 112 teat up (+z axis) using a series of genetic processes. In some embodiments, the series of genetic processes are meant to minimize the cross-sectional area of the point cloud at the top, minimize the height of the overall scan and minimize the average normal at the heights part of the scan. In some embodiments, the series of genetic processes may randomly mutate parameters through multiple iterations until a local minima is achieved. In some embodiments, these genetic processes are different than machine learning in that they do not require training. In some embodiments, three genetic processes may be used in the order described below.

Figure 9:
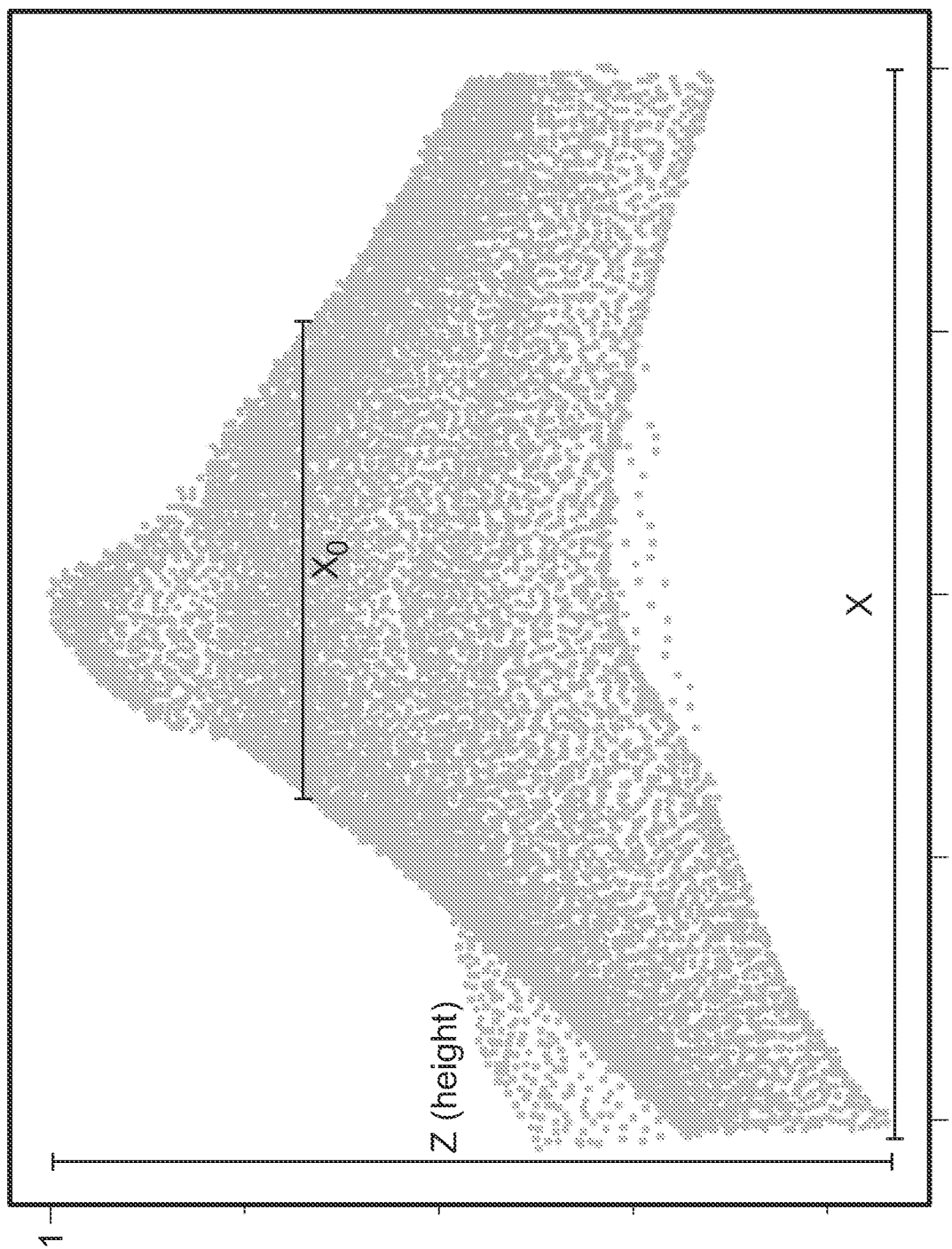
FIG. 9 is a three-dimensional point cloud after a first genetic process of a genetic algorithm, according to one or more embodiments of the present disclosure.

In some embodiments, the first genetic process of the genetic algorithm may minimize the overall height of the scan by rotating the point cloud in the x and y axis and the ratio of the x and y dimensions ($X_0$ and $Y_0$) at the top quarter of the scan to the x and y dimension of the scan as a whole, as depicted in FIG. 9.

Figure 10:
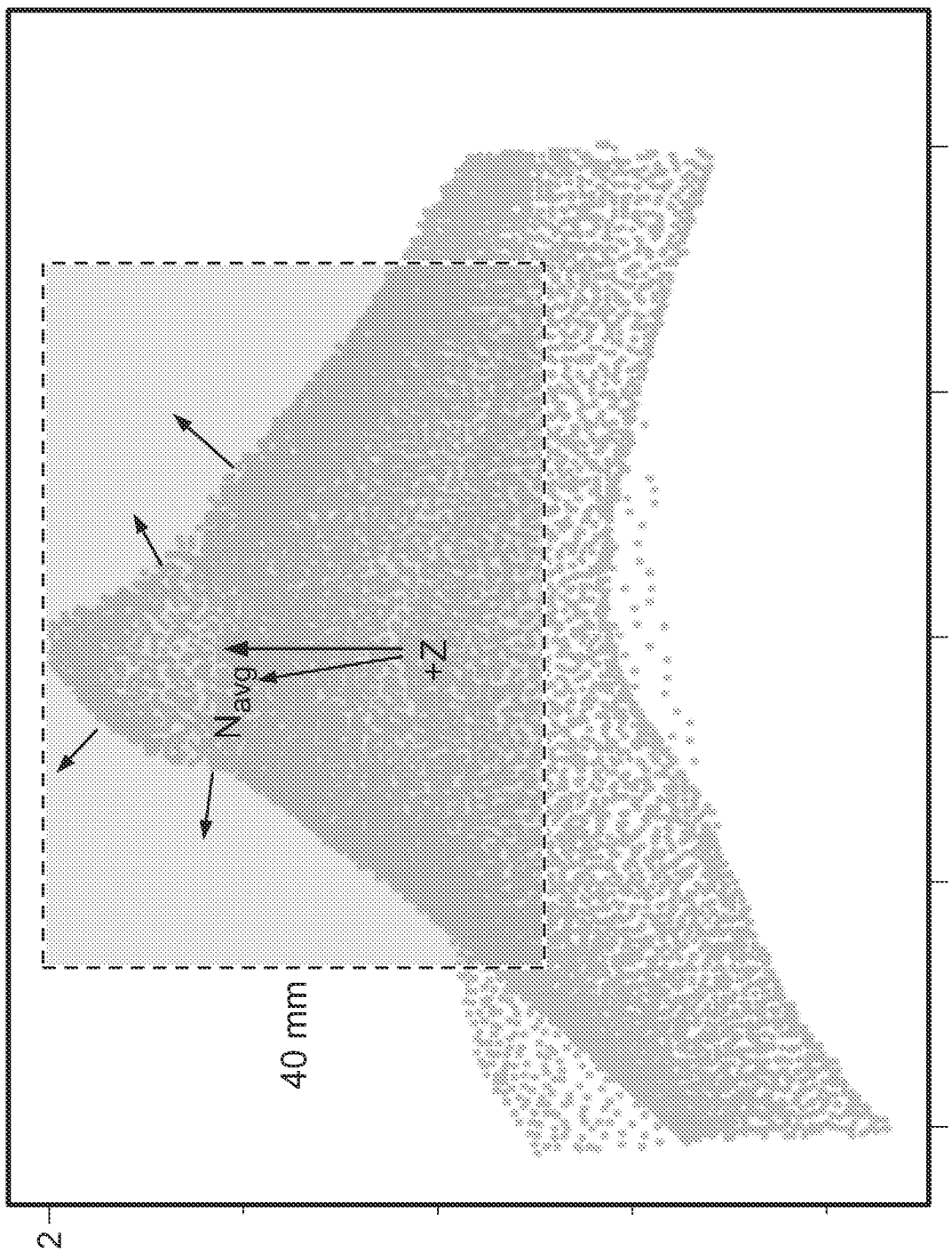
FIG. 10 is a three-dimensional point cloud after a second genetic process of a genetic algorithm, according to one or more embodiments of the present disclosure.

In some embodiments, the second genetic process of the genetic algorithm may set the average normal at the top portion of the scan as close to the +Z axis as possible, as depicted in FIG. 10.

Figure 11:
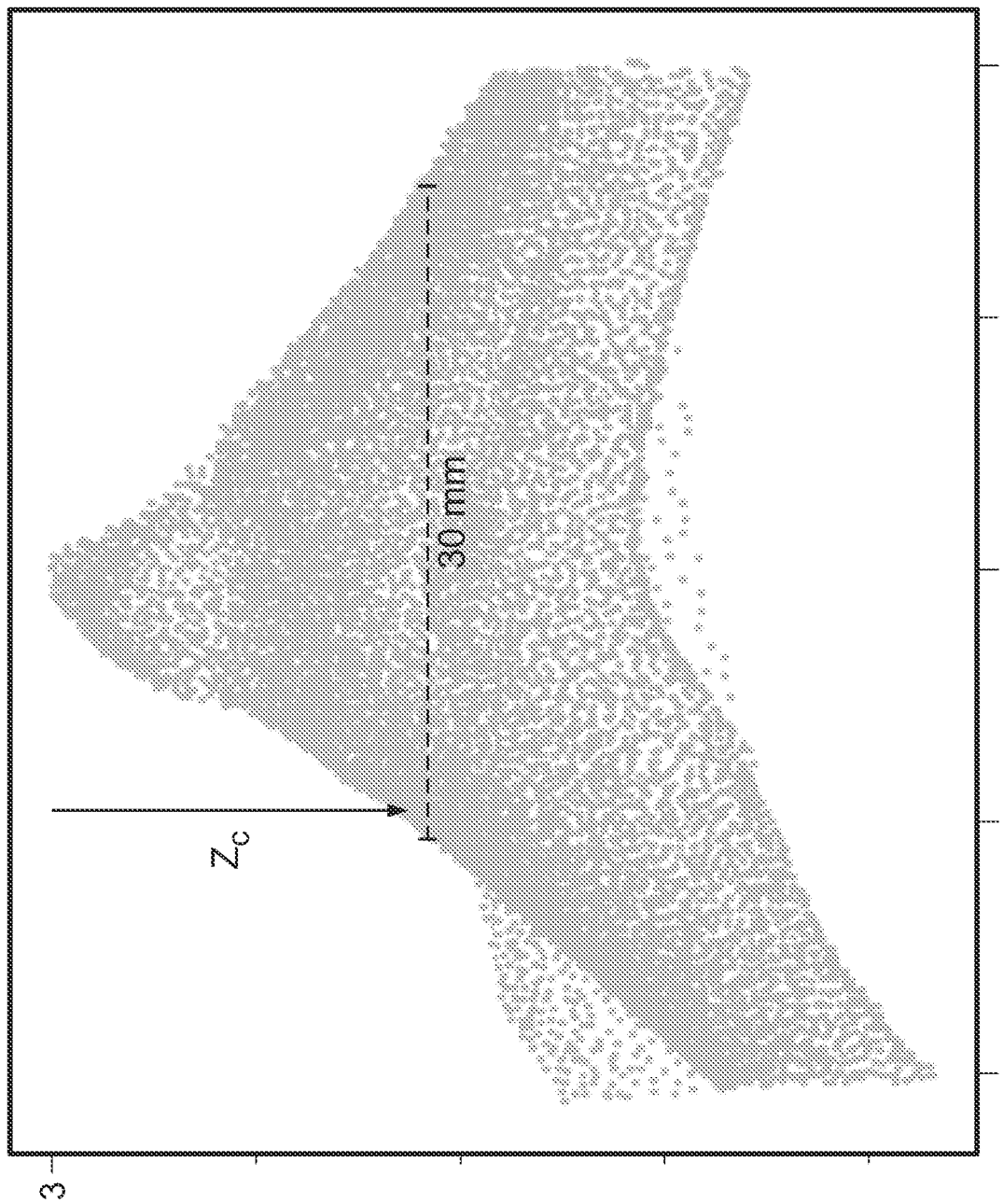
FIG. 11 is a three-dimensional point cloud after a third genetic process of a genetic algorithm, according to one or more embodiments of the present disclosure.

In some embodiments, the third genetic process of the genetic algorithm may maximize a height at which the teat exceeds a predetermined cross-sectional diameter ($Z_c$), as depicted in FIG. 11. In some embodiments, the predetermined cross-sectional diameter is 30 mm. In some embodiments, the predetermined cross-sectional diameter is 25 mm to 35 mm; or 27 mm to 35 mm; or 29 mm to 35 mm; or 31 mm to 35 mm; or 33 mm to 35 mm; or 25 mm to 33 mm; or 25 mm to 31 mm; or 25 mm to 29 mm; or 25 mm to 27 mm; or 26 mm to 30 mm; or 29 mm to 30 mm; or 30 mm to 31 mm. In some embodiments, each generation in the genetic process may score itself based on rotations along the x and y axes. In some embodiments, once the smallest possible score is achieved, the genetic algorithm may move on to the next genetic process until the scan is properly oriented. In some embodiments, if the genetic algorithm sees that there are too many holes around the edge of the teat, the genetic algorithm will ask the user to redo the scan image, making sure that the user moves slowly from underneath the breast to above the nipple.

Figure 12:
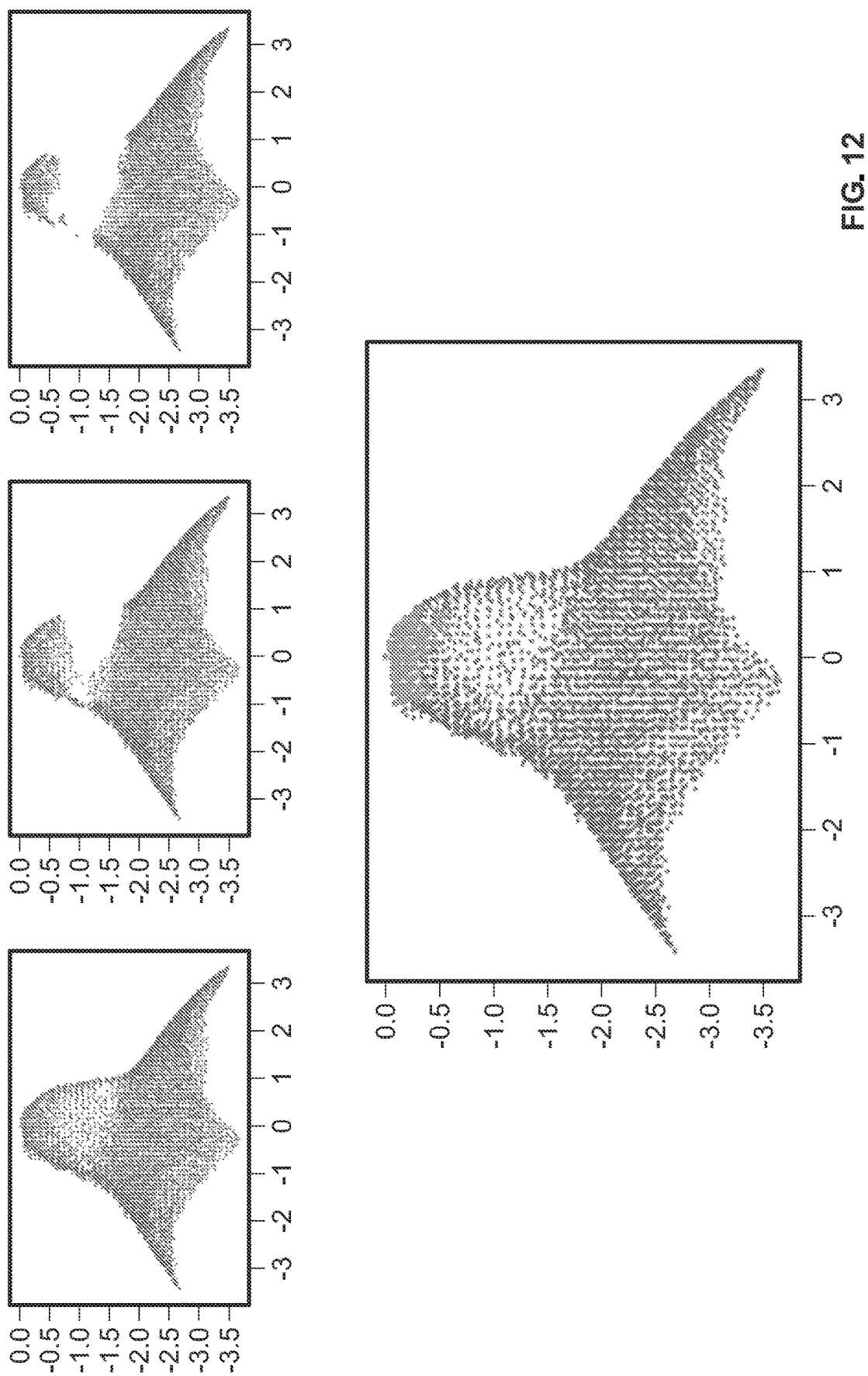
FIG. 12 is a three-dimensional point cloud after the genetic algorithm filters out the normal, according to one or more embodiments of the present disclosure.

At 320, the algorithm module 140 may use the genetic algorithm to filter out the normal of each point in the point cloud further and further away from the +Z axis, until there is a clear separation between the teat and the nipple base, as depicted in FIG. 11. In some embodiments, the normal of each point in the point cloud may be estimated based on the positions of the point's nearest neighbors. In some embodiments, the dot product of each normal is taken with the +Z axis ([0,0,1]). In some embodiments, the genetic algorithm then measures the width at the bottom of the teat and the top of the nipple base to get the teat width and the nipple base width, respectively. In some embodiments, the genetic algorithm then measures the distance between the +Z axis at the base and the +Z axis at the top of the nipple scan to get the nipple height, as depicted in FIG. 12. In some embodiments, if the genetic algorithm is unable to separate the nipple base and the teat, the genetic algorithm indicates that the user should try to stimulate the nipple more. In some embodiments, if the genetic algorithm sees that the top of the scan is above a quarter of the width of the bottom of the scan, the genetic algorithm may provide an error and asks the user if she moved during the scan.

Figure 13:
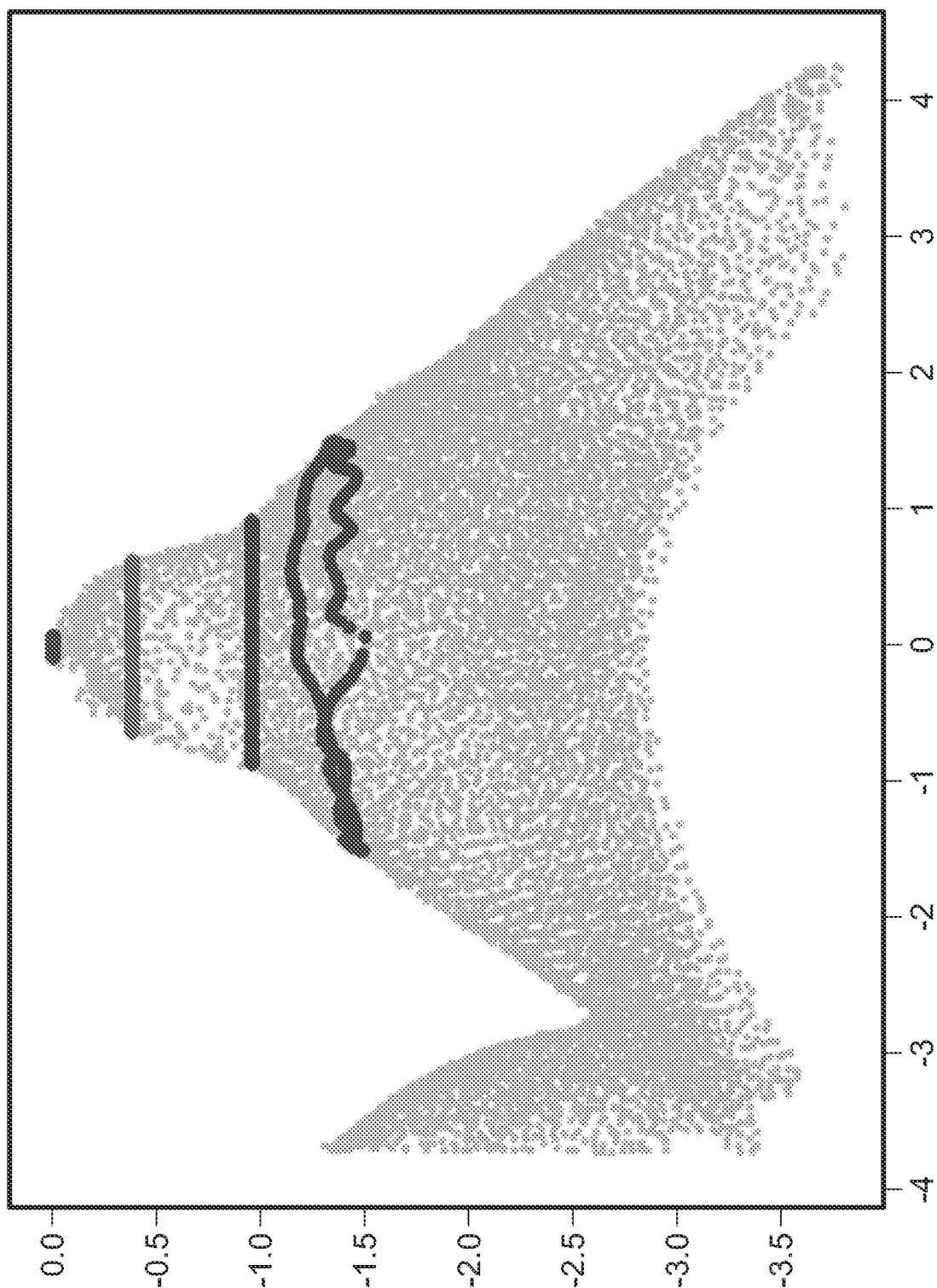
FIG. 13 is a three-dimensional point cloud after the genetic algorithm filters out the normal, according to one or more embodiments of the present disclosure.

In some embodiments, at 330, the genetic algorithm may analyze the keyframe image extracted from the scan image 112 at the center of the nipple's detected bounding box and the surround area of the teat's bounding box to get information on texture and color, as depicted in FIG. 13. Specifically, in some embodiments, once the nipple scanning application 130 returns images of the breast during scanning and a front "key frame" image is identified, the trained machine learning engine 144 may identify the teat. In some embodiments, once the teat's location is identified in a 2D frame, the average color of the pixels around the teat area may be used as the color value for that user.

Figure 7D:
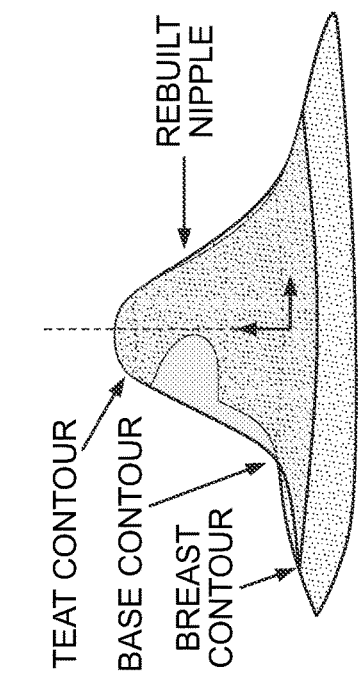
FIG. 7D is a nipple point cloud with predetermined contours combined to rebuild the user's nipple without any gaps or holes, according to one or more embodiments of the present disclosure.
Figure 7E:
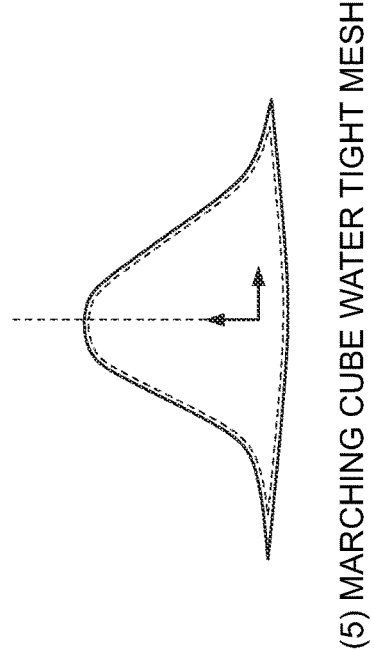
FIG. 7E is a marching cube watertight mesh, according to one or more embodiments of the present disclosure.

At step 230, once the location of the z height of teat and base diameters are found, predetermined contours may be combined to rebuild the user's nipple without any gaps or holes, as depicted in FIG. 7D. In some embodiments, nipple scanning application 130 may extract key features and measurements from the scan images that are used to replicate the shape and size of the user's nipple. For example, in some embodiments, the predetermined contours may include: a predetermined contour along the breast, a predetermined contour at the base of the nipple, a predetermined contour at the teat and a predetermined contour around the nipple apex. Finally, in some embodiments, a marching cubes function may be used to create a solid watertight mesh, as depicted in FIG. 7E.

Figure 15:
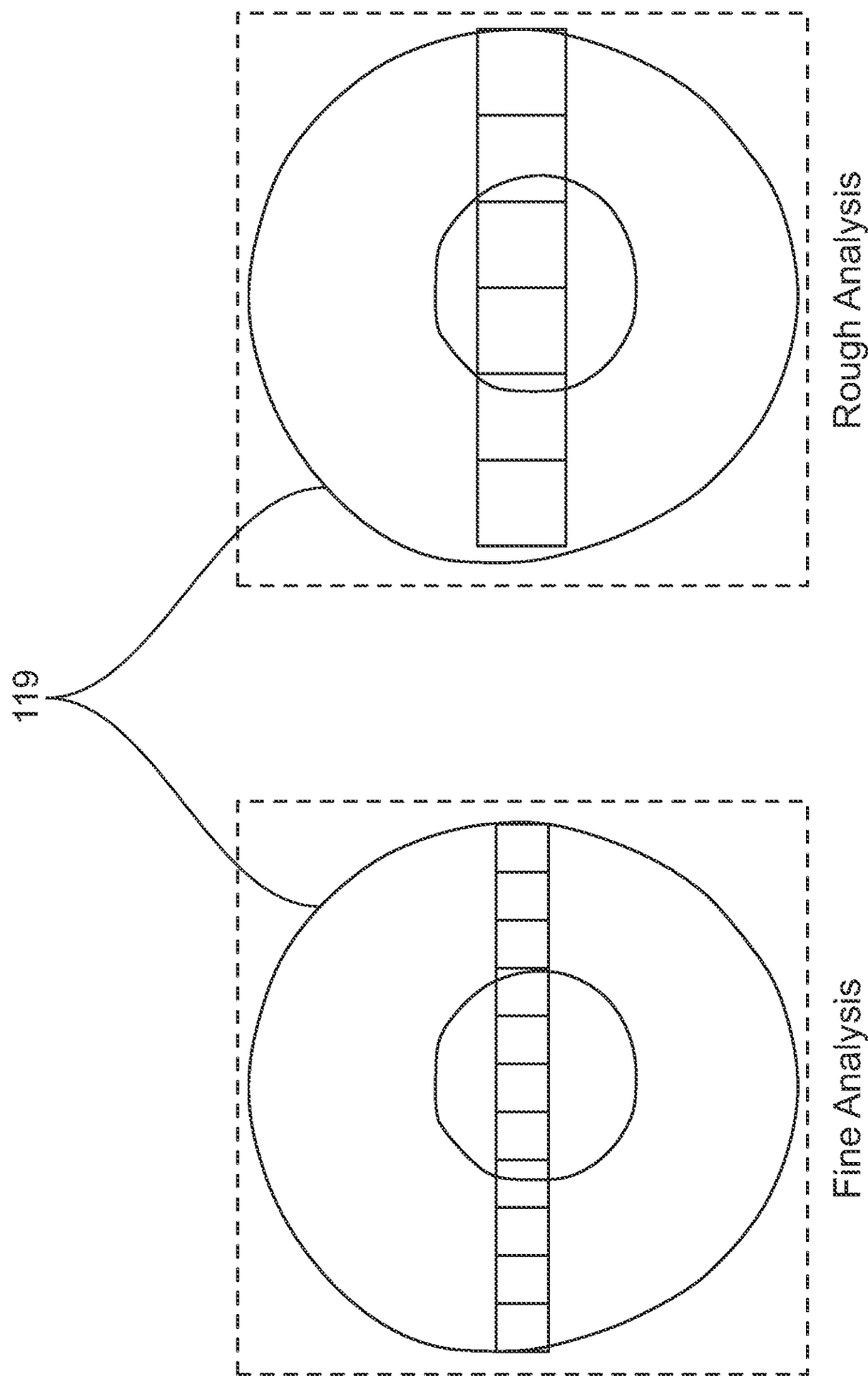
FIG. 15 is a fine scale analysis and a rough scale analysis, according to one or more embodiments of the present disclosure.
Figure 17:
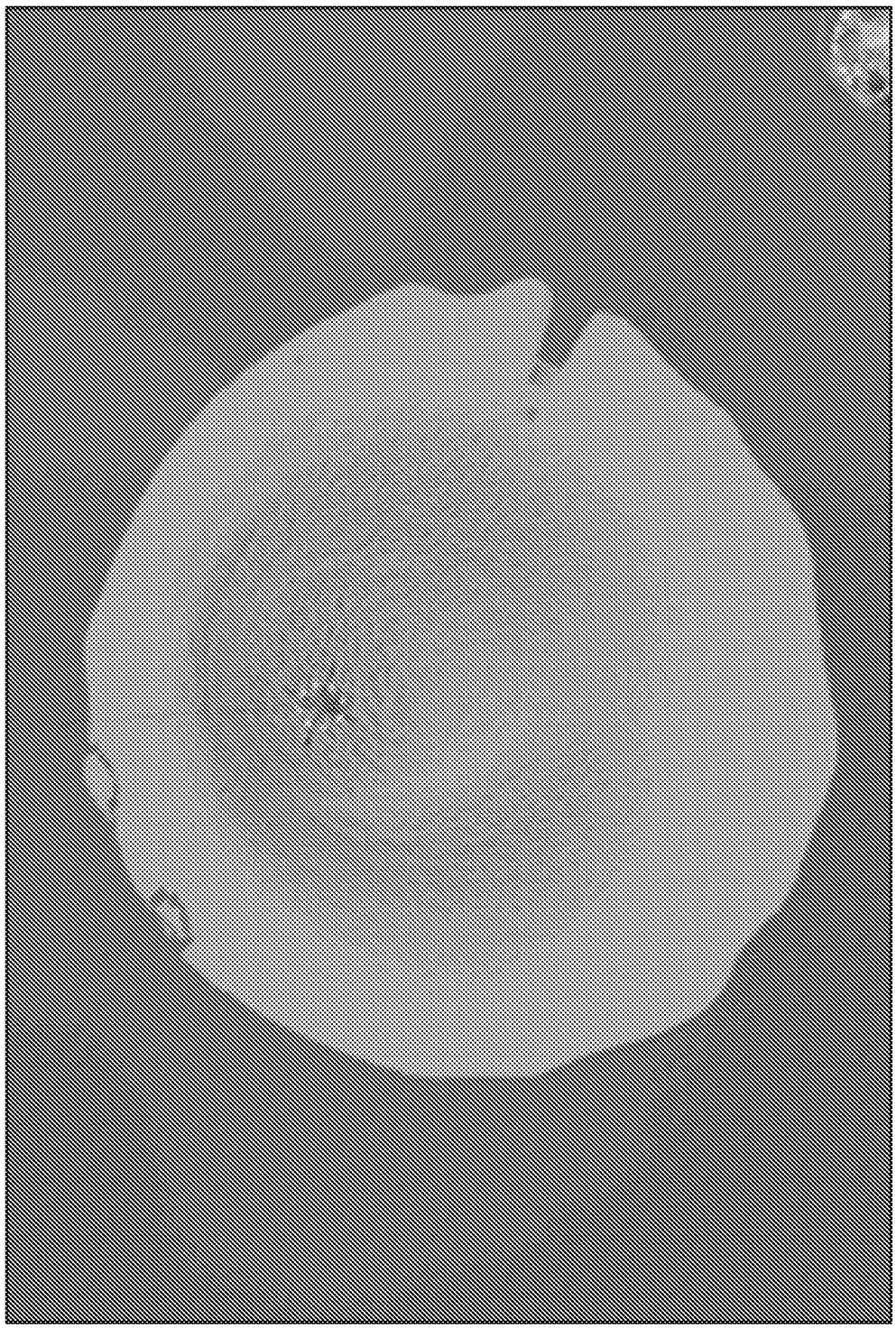
FIG. 17 is a custom displacement map that estimates the skin texture roughness across the user's nipple, according to one or more embodiments of the present disclosure.

At step 235, the RGB frames provided by the nipple scanning application 130 through the scanning process may be used to generate a texture of the scanned nipple. In some embodiments, the object detection model may determine which frame 114 of the scan image 112 is aligned with the majority of the nipple and areola (frontal view). In some embodiments, the frame 114 may be isolated and used to measure "roughness" across the areola's and nipple's surfaces utilizing at least one gray scale image analysis tool. A sample output graphs of a roughness algorithm are depicted in FIG. 14. In some embodiments, at least one gray scale image analysis tool may be used at two different resolutions to determine large scale roughness values and fine scale roughness values. Examples of fine scale analysis and rough scale analysis are depicted in FIG. 15, according to embodiments of the present disclosure. In some embodiments these roughness values may be used to generate intensity maps, indicating where roughness/bumpiness is strongest, and where roughness/bumpiness is weakest, based on white and black values, respectively. FIG. 16 depicts an exemplary smooth intensity map and a rough intensity map, according to embodiments of the present disclosure. In some embodiments, the intensity maps may be plugged into a novel procedural texture based on multiple voronoi algorithms built in Blender® to create a custom displacement map that estimates the skin texture roughness across the user's nipple, as depicted in FIG. 17.

At step 240, once the custom geometry with its personalized texture is created, the nipple's 3D custom shape may be translated into a 3D baby bottle nipple profile that fits with a standard baby bottle. Specifically, the 3D baby bottle nipple, while having the shape of the user's nipple, may be size and formatted to fit to a standard commercial baby bottle. In some embodiments, the baby bottle nipple profile may include a base portion that may connect with a standard baby bottle via a baby bottle collar. In some embodiments, the baby bottle nipple profile may include a base portion that connects directly to a standard baby bottle.

At step 245, the custom 3D baby bottle nipple profile is sent to the server 106. The standard 3D nipple profile is accessible on the server 106 by the second user computing device 105 for 3D printing.

At step 250 a custom baby bottle nipple, based on the custom 3D baby bottle nipple profile, is 3D printed. In some embodiments, the custom baby bottle nipple may be integrated into a standard manufactured baby bottle part. In some embodiments, the result is a baby bottle capped with a 3D printed nipple designed to mimic the geometry and feel of the user's nipple.

In some embodiments, the entire process sits in three different "locations." The initial process of scanning the nipple and identifying its location in 3D space exists on the user's phone—the first location. The phone application produces a colored scan, eight points defining the nipple's location and a series of RGB images that are sent to a virtual machine for post-processing and texturing using the Genysis® API—the second location. The Genysis® API then sends the resulting key dimensions, solid watertight printable mesh .stl file, a single color value and any error information to a server for 3D printing and archiving—the third location.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:
1. A method comprising:
 obtaining, by at least one processor, a 3D scanned visual output comprising an exposed nipple of a user, wherein the obtaining comprises:
  instructing, by the at least one processor, a mobile device, comprising a camera, to scan an area to acquire a 3D scanned visual input;
  wherein the area comprises the exposed nipple;
  wherein the 3D scanned visual input comprises a plurality of visual digital representations of the area that comprises the exposed nipple;
  receiving, by the at least one processor, the 3D scanned visual input;
  determining, by the at least one processor, when at least one visual digital representation of the exposed nipple in the plurality of digital representations is complete or incomplete within the 3D scanned visual input;
  generating, by the at least one processor, an indication to the user to inform the user when the visual digital representation of the exposed nipple is incomplete so as to direct the user to reposition the mobile device that scans the area to re-acquire or continue to acquire the 3D scanned visual input; and
  utilizing, by the at least one processor, when the visual digital representation of the exposed nipple is complete within the 3D scanned visual input, a nipple detection machine learning model to generate at least one bounding box within the 3D scanned visual input that includes the exposed nipple;
  wherein the 3D scanned visual output comprises the exposed nipple within the at least one bounding box within the 3D scanned visual input; and
 determining, by the at least one processor, based on the 3D scanned visual output, a custom nipple profile associated with the exposed nipple within the at least one bounding box.
2. The method of claim 1, further comprising training, by the at least one processor, the nipple detection machine learning model to identify the exposed nipple within the 3D scanned visual input based at least in part on a set of images comprising at least a portion of a nipple of a human.
3. The method of claim 1, wherein the plurality of visual digital representations are videos comprising at least two image frames.

4. The method of claim 3, further comprising gathering and creating a point cloud, by the at least one processor, by stitching each image frame of each of the at least two image frames together.

5. The method of claim 4, further comprising:
orienting, by the at least one processor, the point cloud with a teat of the exposed nipple in a predetermined direction.

6. The method of claim 5, wherein the predetermined direction is along a positive z axis.

7. The method of claim 6, further comprising setting, by the at least one processor, an average normal at a top portion of the point cloud based on the positive z axis.

8. The method of claim 7, further comprising maximizing, by the at least one processor, a height at which the teat exceeds a predetermined cross-sectional diameter.

9. The method of claim 8, wherein the predetermined cross-sectional diameter is 30 mm.

10. The method of claim 6, further comprising filtering out, by the at least one processor, a normal of each point in the point cloud further and further away from the positive z axis until there is a clear separation between the teat and a base of the exposed nipple.

11. The method of claim 1, wherein the nipple detection machine learning model is trained to identify the exposed nipple within the plurality of visual digital representations.

12. The method of claim 1, further comprising receiving, by the at least one processor, a plurality of rescanned images if the nipple detection machine learning model does not identify the exposed nipple within the plurality of visual digital representations.

13. The method of claim 1, further comprising rebuilding, by the at least one processor, the exposed nipple without any gaps or holes by extracting key contours and measurements from the 3D scanned visual input.

14. The method of claim 1, wherein determining the custom nipple profile comprises:
determining, by the at least one processor, based on the 3D scanned visual output and one or more nipple profiles associated with baby bottles, the custom nipple profile associated with the exposed nipple.

15. The method of claim 1, wherein determining the custom nipple profile comprises:
utilizing, by the at least one processor, a genetic algorithm to extract a plurality of nipple-related geometric features from the 3D scanned visual output comprising the exposed nipple within the at least one bounding box within the 3D scanned visual input;
wherein the plurality of nipple-related geometric features comprise:
nipple-related height, and
nipple-related width; and
determining, by the at least one processor, based on the plurality of nipple-related geometric features, the custom nipple profile associated with the exposed nipple.

16. The method of claim 1, wherein determining the custom nipple profile comprises:
utilizing, by the at least one processor, a genetic algorithm to extract a nipple-related color and a plurality of nipple-related geometric features from the 3D scanned visual output comprising the exposed nipple within the at least one bounding box within the 3D scanned visual input;
wherein the plurality of nipple-related geometric features comprise:
nipple-related height, and
nipple-related width; and
determining, by the at least one processor, based on the plurality of nipple-related geometric features and the nipple-related color, the custom nipple profile associated with the exposed nipple.

17. The method of claim 1, wherein receiving, by the at least one processor, the 3D scanned visual input comprises:
identifying, by the mobile device, the exposed nipple within the 3D scanned visual input;
transmitting, by the mobile device, to the at least one processor, the 3D scanned visual input identifying the exposed nipple; and
receiving, by the at least one processor, the 3D scanned visual input identifying the exposed nipple.

18. A system comprising:
a non-transitory computer readable medium storing instructions; and
at least one processor configured to execute the instructions that cause the at least one processor to:
obtain a 3D scanned visual output comprising an exposed nipple of a user, wherein the obtaining comprises:
instruct a mobile device comprising a camera to scan an area to acquire a 3D scanned visual input;
wherein the area comprises the exposed nipple;
wherein the 3D scanned visual input comprises a plurality of visual digital representations of the area that comprises the exposed nipple;
receive the 3D scanned visual input;
determine when at least one visual digital representation of the exposed nipple in the plurality of digital representations is complete or incomplete within the 3D scanned visual input;
generate an indication to the user to inform the user when the visual digital representation of the exposed nipple is incomplete so as to direct the user to reposition the mobile device that scans the area to acquire or continue to acquire the 3D scanned visual input; and
utilize, when the visual digital representation of the exposed nipple is complete within the 3D scanned visual input, a nipple detection machine learning model to generate at least one bounding box within the 3D scanned visual input that includes the exposed nipple;
wherein the 3D scanned visual output comprises the exposed nipple within the at least one bounding box within the 3D scanned visual input; and
determine, based on the 3D scanned visual output, a custom nipple profile associated with the exposed nipple within the at least one bounding box.

19. The system of claim 18, wherein determining the custom nipple profile comprises:
determine, based on the 3D scanned visual output and one or more nipple profiles associated with baby bottles, the custom nipple profile associated with the exposed nipple.

20. The system of claim 18, wherein determining the custom nipple profile comprises:
utilize a genetic algorithm to extract a plurality of nipple-related geometric features from the 3D scanned visual output comprising the exposed nipple within the at least one bounding box within the 3D scanned visual input;
wherein the plurality of nipple-related geometric features comprise:
nipple-related height, and
nipple-related width; and determine, based on the plurality of nipple-related geometric features, the custom nipple profile associated with the exposed nipple.

21. The system of claim 18, wherein determining the custom nipple profile comprises:
utilize a genetic algorithm to extract a nipple-related color and a plurality of nipple-related geometric features from the 3D scanned visual output comprising the exposed nipple within the at least one bounding box within the 3D scanned visual input;
wherein the plurality of nipple-related geometric features comprise:
nipple-related height, and
nipple-related width; and
determine, based on the plurality of nipple-related geometric features and the nipple-related color, the custom nipple profile associated with the exposed nipple.

\* \* \* \* \*